(12) United States Patent
Woo (10) Patent No.: US 9,085,346 B2
(45) Date of Patent: Jul. 21, 2015

(54) DEVICE AND METHOD FOR CONTROLLING FLOATING STRUCTURE

(76) Inventor: Do Young Woo, Gangwon-do (KR)

( * ) Notice: Subject to any disclaimer, the term of this patent is extended or adjusted under 35 U.S.C. 154(b) by 0 days.

(21) Appl. No.: 14/006,058

(22) PCT Filed: Mar. 21, 2012

(86) PCT No.: PCT/KR2012/002000
§ 371 (c)(1),
(2), (4) Date: Oct. 1, 2013

(87) PCT Pub. No.: WO2012/128541
PCT Pub. Date: Sep. 27, 2012

(65) Prior Publication Data
US 2014/0020613 A1    Jan. 23, 2014

(30) Foreign Application Priority Data

Mar. 21, 2011   (KR) .......................... 10-2011-0024722
Jun. 2, 2011    (KR) .......................... 10-2011-0053352
Jul. 19, 2011   (KR) .......................... 10-2011-0071361

(51) Int. Cl.
| | |
|---|---|
| B63B 21/50 | (2006.01) |
| F24J 2/38 | (2014.01) |
| F24J 2/52 | (2006.01) |
| H01L 31/042 | (2014.01) |
| F24J 2/40 | (2006.01) |
| F24J 2/54 | (2006.01) |
| B63B 35/44 | (2006.01) |

(52) U.S. Cl.
CPC . *B63B 21/50* (2013.01); *F24J 2/38* (2013.01); *F24J 2/5269* (2013.01); *H02S 20/00* (2013.01); *B63B 2035/4453* (2013.01); *F24J 2/40* (2013.01); *F24J 2/542* (2013.01); *F24J 2002/5458* (2013.01); *Y02E 10/47* (2013.01); *Y02E 10/50* (2013.01)

(58) Field of Classification Search
CPC ....................................................... B63B 21/50
USPC ...................... 114/230.13; 141/279; 441/4, 5; 405/224, 228
See application file for complete search history.

(56) References Cited

U.S. PATENT DOCUMENTS

| | | | | |
|---|---|---|---|---|
| 4,516,882 | A  * | 5/1985 | Brewer et al. ............... | 405/224 |
| 7,121,221 | B2 * | 10/2006 | Lawrence ................ | 114/230.13 |
| 2014/0020613 | A1 * | 1/2014 | Woo .......................... | 114/230.13 |

FOREIGN PATENT DOCUMENTS

| | | | |
|---|---|---|---|
| JP | 2010281585 | A  * | 12/2010 |
| KR | 20090105658 | A | 10/2009 |
| KR | 100942904 | B1 | 2/2010 |
| KR | 20100098084 | A | 9/2010 |
| WO | WO 2012128541 | A2 * | 9/2012 |

* cited by examiner

*Primary Examiner* — Lars A Olson
*Assistant Examiner* — Jovon Hayes
(74) *Attorney, Agent, or Firm* — Stetina Brunda Garred & Brucker (57) ABSTRACT

Aspects of the present invention relate to a device and method for controlling a floating structure of a solar power generating device, which can generate electricity from solar power of incident light while tracking the position of the sun in a state in which it floats on the water.

12 Claims, 6 Drawing Sheets

DEVICE AND METHOD FOR CONTROLLING FLOATING STRUCTURE

CROSS-REFERENCE TO RELATED APPLICATION

The present application claims priority to International Application No. PCT/KR2012/002000 filed Mar. 21, 2012, which claims priority to Korean Patent Application Nos. 10-2011-0024722 filed Mar. 21, 2011, 10-2011-0053352 filed Jun. 2, 2011, and 10-2011-0071361 filed Jul. 19, 2011, the entire contents of which are incorporated herein by reference.

BACKGROUND OF THE INVENTION

1. Field of the Invention

Aspects of the present invention relate to a device and method for controlling a floating structure of a solar power generating device, which can generate electricity from solar power of incident light while tracking the position of the sun in a state in which it floats on the water.

2. Description of the Related Art

Recently, a floating structure equipped with a solar power generating device is operated to be floatable in reservoir or lake.

In general, a solar power generation method directly converts solar power into electrical energy by a solar cell. Differently from a solar heat generation method for generating energy using heat energy of sunlight, the solar power generation method generates electrical energy directly from sunlight by the solar cell formed of semiconductors.

In detail, the conventional solar power generating device includes a floating structure that is floatable on the water, a solar cell module installed on the floating structure, having a plurality of solar cells connected to each other and converting sunlight energy incident from the sun into electrical energy, and a floating structure rotating unit rotating the floating structure along the solar orbit.

With this configuration, since electricity generation efficiency of the solar cell module depends upon an incidence angle of sunlight, it is necessary to appropriately rotate the floating structure using the floating structure rotating unit according to the seasonal time zone.

The floating structure rotating unit is operated to control its rotation by cross-linking a pair of power units installed on the ground to both edges of the floating structure using a pair of wires and unwinding and winding of the wires. Since unwinding and wound amounts of the pair of wires cannot be precisely measured, it is difficult to accurately control the rotation of the floating structure.

The water level of the reservoir or lake may be changed by environmental factors. Accordingly, tension may be applied to the wires of the floating structure rotating unit. If the tension applied the wires exceeds a tensile strength, the wires may be broken. Thus, a change in the water level of the reservoir or lake may impair stability of the floating structure.

A conventional solar power generating device is configured such that a post is inserted to stand at the center of a floating structure to guide up-down movement of the floating structure while minimizing vibration or shock of the floating structure due to water conditions and the post is firmly supported by a separate support unit.

Therefore, the floating structure can stably rotate about the post along a predetermined track of sunlight. In a case where the floating structure rotating unit is damaged due to a big wave or wind, a rotation restraining state is released, so that an incidence angle with respect to the solar cell module may not be controlled and solar power generation may not be stably operated.

SUMMARY OF THE INVENTION

Aspects of the present invention provide a device and method for controlling a floating structure of a solar power generating device, which can precisely control rotation of the floating structure.

Other aspects of the present invention provide a device for controlling a floating structure, which can maintain stability even when a water level change occurs in the reservoir or lake.

Aspects of the present invention further provide a device for controlling a floating structure, which can temporarily support the floating structure when a floating structure rotating unit is damaged.

In accordance with one aspect of the present invention, there is provided a device for controlling a floating structure of a solar power generating device, the device including a floating structure (110) installed to be floatable on the water (W), a post (120) passing through the center of the floating structure (110) to then fixedly rise and inducing ascending and descending of the floating structure (110) according to the water level, a floating structure rotating unit (130) including a pair of first and second power devices (131, 132) installed on the ground, and a pair of first and second wires (133, 134) having both ends connected to the first and second power devices (131, 132) and the floating structure (110) to cross each other, a wire winding measurement unit (140) fixedly installed on the ground to correspond to the first wire (133) and measuring a wound amount, and a control unit (150) connected to the wire winding measurement unit (140) and controlling forward and backward actuation of the pair of first and second power devices (131, 132) according to the reference angle depending on the seasonal solar orbit.

The wire winding measurement unit (140) may include a fixing member (141) fixedly installed on the ground, an extending member (143) supported at one side of the fixing member (141) and extending in a lengthwise direction of the first wire (133), a plurality of rollers (145) installed at one side of the extending member (143) so as to allow the first wire (133) to be wound at a constant interval and rotatably installed according to winding of the first wire (133), and a sensor member (147) fixed at the other side of the extending member (143) and sensing the number of turns of one of the plurality of rollers (145).

The sensor member (147) may include a bar (147a) extending to the outside of the one of the plurality of rollers (145) and rotating in an interlocked manner, and a sensor (147b) installed at the other side of the extending member (143) so as to correspond to the bar (147a).

The sensor (147b) may be electrically connected to the control unit (150).

The device may further include a water level measurement unit (160) positioned in an internal space (122) of the post (120) and measuring the water level.

An air inlet hole (124) and a water inlet hole (126) may be formed in the post (120), the air inlet hole (124) formed at an upper portion of the post (120) and allowing the inflow of air into the internal space (122), and the water inlet hole (126) formed at a lower portion of the post (120) and allowing the inflow of water into the internal space (122).

The water level measurement unit (160) may include a buoyancy member (162) positioned on the surface of water induced into the internal space (122) of the post (120), and a distance measurement sensor (164) mounted in an internal space of the floating structure (110) and measuring the distance of the buoyancy member (162).

The device may further include a rotation preventing wire (170) having a center wound around either of top and bottom ends of the post (120) and both ends engaged with both sides of the floating structure (110).

Both ends of the rotation preventing wire (170) may be loosely installed such that rotation of the floating structure (110) is not interfered.

A wire fixing member (176) may be installed in the post (120), the wire fixing member (176) fixing a winding position of the rotation preventing wire (170).

In accordance with another aspect of the present invention, there is provided a method for controlling a floating structure of a solar power generating device, the method including a first step (S10) of actuating first and second power devices (131, 132) forward and backward, a third step (S30) of measuring an rotation angle of the floating structure (110) based on an wound amount of the first wire (133), a fourth step (S40) of comparing the measured rotation angle of the floating structure (110) with a reference angle input according to the seasonal solar orbit, and a fifth step (S50) of fixing the floating structure (110) by stopping the actuating of the first and second power devices (131, 132).

The method may further include a second step (S20) of measuring a rotation time of a roller (145) having a bar (147a) installed therein when the first and second power devices (131, 132) are actuated forward and backward.

As described above, in the device and method for controlling a floating structure of a solar power generating device, rotation of the floating structure can be accurately controlled according to the solar orbit.

In addition, the device for controlling a floating structure of a solar power generating device according to the present invention can maintain stability even when a water level change occurs in the reservoir or lake.

Further, the device for controlling a floating structure of a solar power generating device according to the present invention can temporarily support the floating structure in a safe manner even when the floating structure is uncontrollable by broken wires due to bad weather, thereby preventing a solar power generating device from being damaged and operating solar power generation in a stable manner.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

Hereinafter, a device for controlling a floating structure according to an embodiment of the present invention will be described in detail with reference to the accompanying drawings.

DETAILED DESCRIPTION OF THE INVENTION

Before the present invention is described terms or words used in the specification and claims of the present invention should not be restrictively construed as having the same meanings as those commonly used or those defined in dictionaries but should be interpreted as having meanings and concepts that are consistent with their meanings and concepts in the context of the spirit or scope of the present invention.

Therefore, the constitution shown in the embodiments and drawings of the present invention are provided only for illustration of the best exemplary embodiment of the present invention but are not provided to completely encompass the spirit or scope of the present invention. Accordingly, it is to be understood that various equivalents and modifications that can be substituted at the time of the filing date of the present application may be made to the invention.

Figure 1:
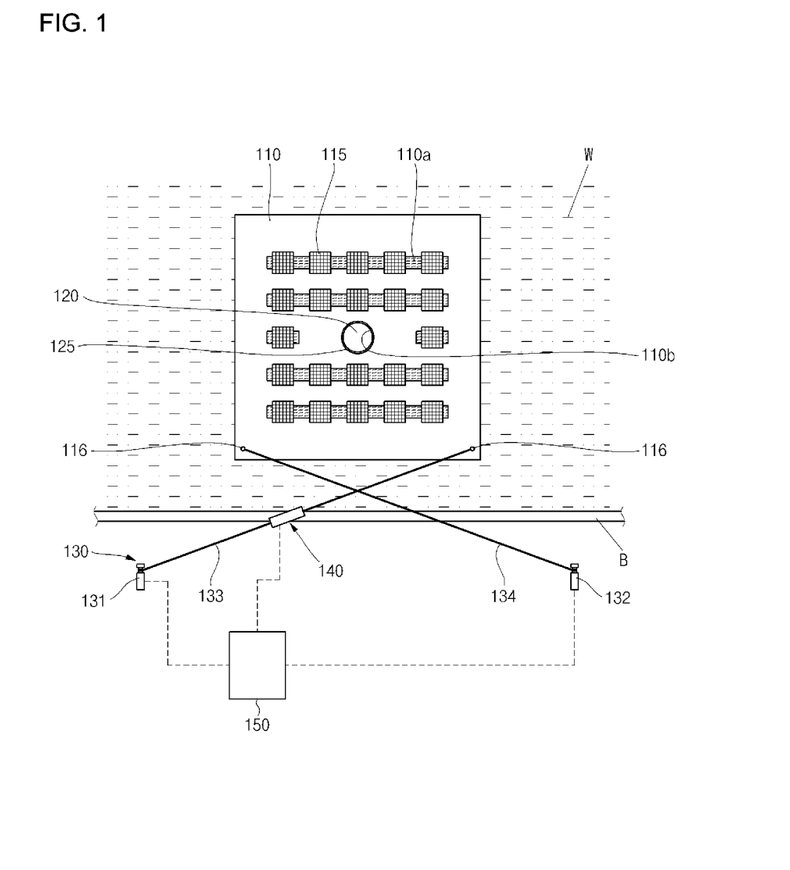
FIG. 1 illustrates a floating structure controlling device according to an embodiment of the present invention.

As shown in FIG. 1, the floating structure controlling device according to an embodiment of the present invention includes a floating structure 110, a post 120, a floating structure rotating unit 130, a wire winding measurement unit 140 and a control unit 150.

The floating structure 110 is formed using a material having buoyancy so as to be floatable on the water (W) and a through-hole 110b may be formed at a predetermined position, preferably at the center of the floating structure 110.

The floating structure 110 may take any shape so long as it has buoyancy without being limited to a particular shape. In the following description, the floating structure 110 will be described by way of example with regard to a case where the floating structure 110 is shaped of a rectangular plate.

A solar energy generating device 115 may be mounted on a top surface of the floating structure 110. The solar energy generating device 115 may include a solar cell module, a power conversion device (not shown), and a storage battery (not shown).

The solar cell module is constituted of a plurality of solar cells connected to each other as a module and may be controlled by a support stand (117 of FIG. 5) capable of varying angles of the solar cell module to allow sunlight to be incident in a vertical direction.

The power conversion device is connected to the solar cell module and converts DC power into AC power, the DC power having the voltage and current generated by the solar cell module not constant.

The storage battery is connected to the power conversion device and is capable of accumulating electricity.

In addition, the floating structure 110 includes a slot hole 110a having a predetermined section pierced such that a water surface and a bottom portion of the solar cell module make contact with each other. Low-temperature gas on the water surface is brought into contact with the heated bottom portion of the solar cell module by convection, thereby cooling the solar cell module.

The post 120 is disposed to stand and guides ascending and descending of the floating structure 110 according to the water level.

In particular, the post 120 penetrates the through-hole 110b of the floating structure 110 and has one end fixed to the bottom of the reservoir or lake and the other end upwardly protruding from the floating structure 110. Thus, a portion of the post 120 is positioned in water, that is, below the water surface, and the other portion of the post 120 is positioned outside the water.

Meanwhile, the floating structure rotating unit 130 includes a pair of first and second power devices 131 and 132 installed on the ground, and a pair of first and second wires 133 and 134 having opposite ends installed at the first and second power devices 131 and 132 and a fixing bar 116 of the floating structure 110 to be cross-linked with each other.

The pair of first and second power devices 131 and 132 may include a motor (not shown) generating power, a decelerator (not shown), a clutch (not shown) for transmitting or interrupting power of the motor, and a brake (not shown) stopping the motor.

The first power device 131 and the second power device 132 are actuated forward and backward, respectively, thereby rotating the floating structure 110.

Figure 2:
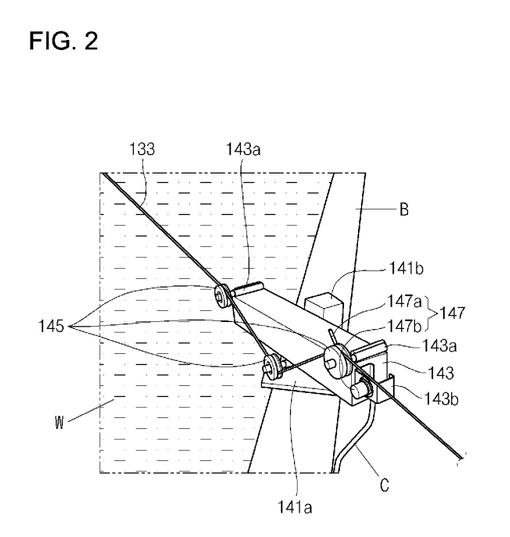
FIG. 2 is an enlarged view illustrating one side of a wire winding measurement unit of FIG. 1.
Figure 3:
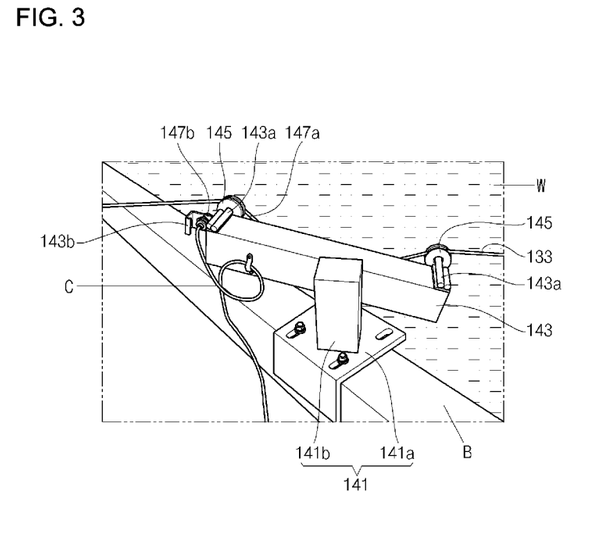
FIG. 3 is a side view illustrating the other side of the wire winding measurement unit FIG. 2.

Meanwhile, as shown in FIGS. 2 and 3, the wire winding measurement unit 140 is installed on the ground so as to correspond to the first wire 133, and measures a wound amount on a real time basis.

The wire winding measurement unit 140 includes a fixing member 141 fixedly installed on a block structure B on the ground, an extending member 143 supported to one side of the fixing member 141 and extending in a lengthwise direction of the first wire 133, a plurality of rollers 145 installed at one side of the extending member 143 to allow the first wire 133 to be wound in a constant interval and rotatably installed according to winding of the first wire 133, and a sensor member 147 fixed at the other side of the extending member 143 and sensing the number of revolutions of one of the plurality of rollers 145.

The fixing member 141 includes an 'L' shaped support unit 141a and a standing unit 141b upwardly installed on the support unit 141a.

The extending member 143 is shaped of a rectangle having a predetermined length and fixedly installed at the standing unit 141b.

The shape of the extending member 143 is not limited to the rectangle and various changes may be made to the shape of the extending member 143 so long as it can support the plurality of rollers 145.

The plurality of rollers 145 are rotatably supported to a fixed shaft 143a installed on a top surface of the extending member 143 to be spaced apart from each other in a lengthwise direction, and are arranged at different heights in a zigzag configuration, thereby establishing a winding state of the first wire 133 more firmly.

Here, the wound amount of the first wire 133 can be estimated per one revolution of the roller 145.

The sensor member 147 includes a bar 147a integrally extending to the outside of the one of the plurality of rollers 145 and rotating in an interlocked manner, and a sensor 147b supported to a bracket 143b installed at the other side of the extending member 143 and corresponding to the bar 147a.

Here, the sensor 147b may include one of known sensors, such as a proximity sensor or an optical sensor, and is electrically connected to the control unit 150 by a cable (C). For example, when a proximity sensor is used as the sensor 147b, the bar 147a is preferably made of a metal.

The control unit 150 is connected to the wire winding measurement unit 140 and the first and second power devices 131 and 132 and estimates a rotation angle of the floating structure 110 based on the number of revolutions of one of the plurality of rollers 145 having the bar 147a installed therein. In addition, the control unit 150 controls forward and backward actuation of the pair of first and second power devices 131 and 132 in units of several seconds or several minutes according to reference angles pre-programmed by seasonal and temporal solar orbits.

Further, when the first and second power devices 131 and 132 are actuated forward and backward, the control unit 150 checks whether one of the plurality of rollers 145 having the bar 147a installed therein rotates normally or not, thereby safely controlling the floating structure rotating unit 130.

That is to say, a reference time, which can be compared with the rotation time of the one of the plurality of rollers 145 having the bar 147a installed therein, is input to the control unit 150. If the rotation time exceeds the reference time, it is determined that the one of the plurality of rollers 145 having the bar 147a installed therein does not rotate normally, and the actuation of the first and second power devices 131 and 132 is forcibly stopped, thereby preventing over-rotation of the floating structure 110.

Here, the control unit 150 may control a greater torque to be applied to the first power device 131 than to the second power device 132 to allow the second wire 134 to be unwound by the wound first wire 133 with a tension.

In addition, the floating structure 110 according to the present invention may further include a bearing 125 for rotatably supporting the floating structure 110 between the through-hole 110b of the floating structure 110 and the circumferential surface of the post 120.

In the embodiment of the present invention, an element for rotatably supporting the floating structure 110 is limited to the bearing 125, but any element can be adopted so long as it can smoothly rotate the floating structure 110 with respect to the post 120.

That is to say, the floating structure 110 includes gear teeth (not shown) formed on its outer peripheral surface, an interlocking gear (not shown) engaged with the gear teeth and a driving gear (not shown) engaged with the interlocking gear to increase a rotation torque by adjusting a gear ratio, thereby easily rotating the floating structure 110.

Hereinafter, a method for controlling the floating structure according to an embodiment of the present invention will be described with reference to the accompanying drawings.

Figure 4:
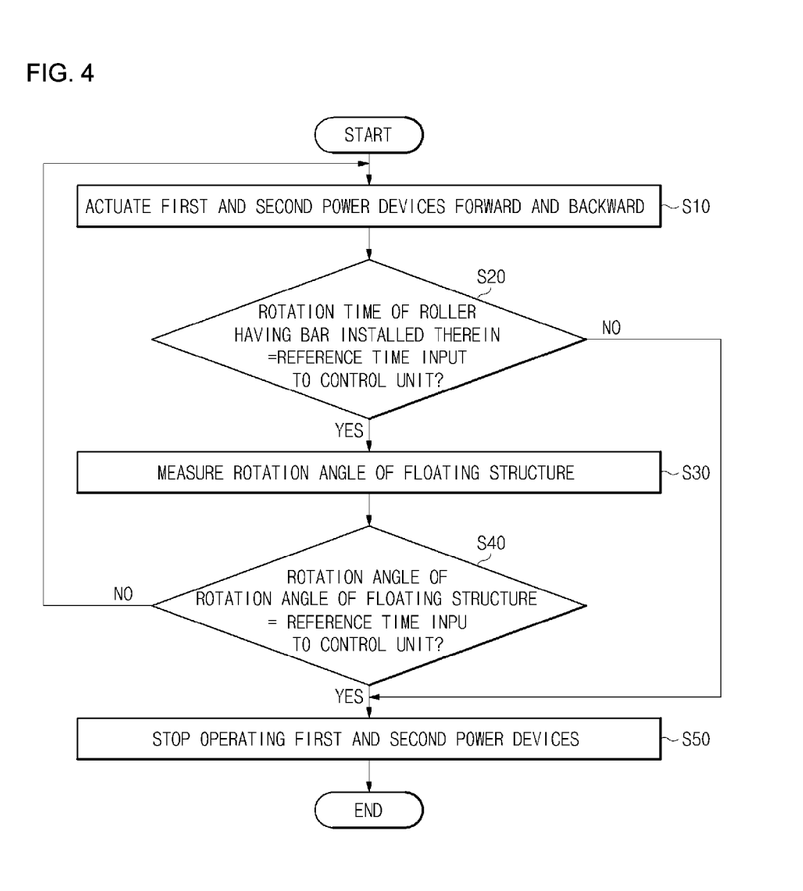
FIG. 4 is a flowchart illustrating a controlling method performed by a floating structure controlling device according to an embodiment of the present invention.

As shown in FIG. 4, the floating structure controlling method according to an embodiment of the present invention includes a first step (S 10) of actuating first and second power devices 131 and 132 forward and backward in a predetermined time unit, a second step (S20) of measuring a rotation time of a roller 145 having a bar 147a installed therein when the first and second power devices 131 and 132 are actuated forward and backward, a third step (S30) of measuring an rotation angle of the floating structure 110 based on an wound amount of the first wire 133, a fourth step (S40) of comparing the measured rotation angle of the floating structure 110 with a reference angle input according to the seasonal solar orbit, and a fifth step (S50) of fixing the floating structure 110 by stopping the actuating of the first and second power devices 131 and 132.

In the first step (S 10), motors of the first and second power devices 131 and 132 are actuated forward and backward for a predetermined time, that is, in units of several seconds or several minutes, to allow the solar energy generating device 115 to move along the solar orbit, thereby rotating the floating structure 110.

That is to say, in order to rotate the floating structure 110 in a clockwise direction (the solar orbit) of FIG. 1, the first wire 133 is wound by driving the motor of the first power device 131 while the second wire 134 is unwound by driving the motor of the second power device 132.

In the second step (S20), when the first and second power devices 131 and 132 are actuated forward and backward, a rotation time of one of the plurality of rollers 145 having a bar 147a installed therein is measured using a sensor 147b and is compared with a reference time input to the control unit 150, thereby determining whether the one of the plurality of rollers 145 having the bar 147a installed therein rotates normally or not.

If the rotation time of the one of the plurality of rollers 145 having the bar 147a installed therein exceeds the reference time of the control unit 150, it is determined that the one of the plurality of rollers 145 having the bar 147a installed therein does not rotate normally. Therefore, the actuating of the first and second power devices 131 and 132 is forcibly stopped, the wire winding measurement unit 140 is checked and repaired, and the process goes back to the first step (S 10).

Next, in the third step (S30), the wire winding measurement unit 140 estimates the wound amount of the first wire 133 based on the number of revolutions of the one of the plurality of rollers 145 having the bar 147a installed therein, thereby measuring the rotation angle of the floating structure 110 on a real time basis.

In addition, in the fourth step (S40), the control unit 150 receives the number of revolutions of the one of the plurality of rollers 145 and compares reference angles set according to seasonal and temporal solar orbits to control the motors of the first and second power devices 131 and 132 to be continuously actuated until the rotation angle of the floating structure 110 reaches a predetermined level.

That is to say, if the reference angle is 4°, the rotation angle of the floating structure 110 can be controlled based on the number of revolutions of the one of the plurality of rollers 145 having the bar 147a installed therein.

If the rotation angle of the floating structure 110 is 2° per one revolution of the one of the plurality of rollers 145, the motors of the first and second power devices 131 and 132 are continuously actuated until the one of the plurality of rollers 145 having the bar 147a installed therein rotates twice.

Thereafter, if the number of revolutions of the one of the plurality of rollers 145 is 2, the actuating of the motors of the first and second power devices 131 and 132 is immediately stopped by a brake, thereby fixing the floating structure 110

The above-described process (the fourth and fifth steps) are repeatedly performed in units of several seconds or several minutes before the sunset, thereby accurately controlling the rotation of the floating structure 110 according to the solar orbit.

After the sunset, the motors of the first and second power devices 131 and 132 are actuated forward or backward which is opposite to that in the above actuation, thereby restoring the floating structure 110 to a morning start position.

Figure 5:
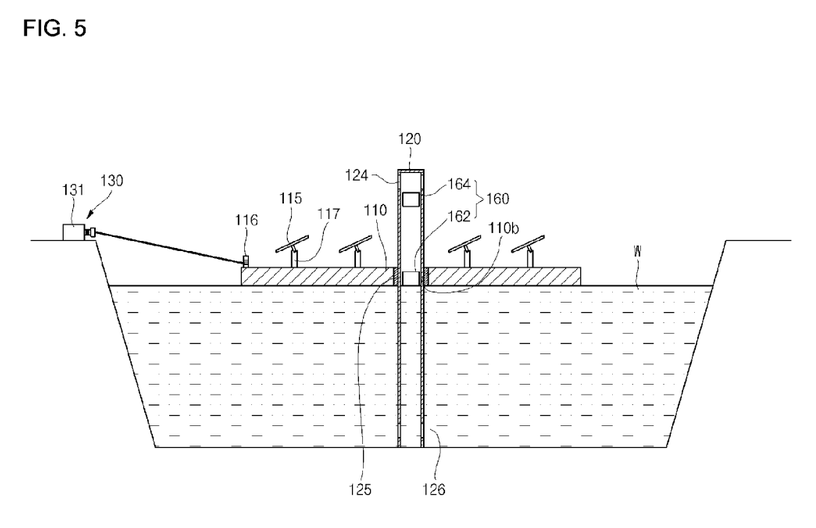
FIG. 5 is a laterally cross-sectional view of a floating structure controlling device according to another embodiment of the present invention.

Meanwhile, as shown in FIG. 5, a floating structure controlling device according to another embodiment of the present invention further includes a water level measurement unit 160.

Here, the post 120 has an internal space 122 and is shaped of a pillar having a laterally cross section corresponding to the through-hole 110b to penetrate the through-hole 110b of the floating structure 110.

The post 120 may further include an air inlet hole 124 and a water inlet hole 126.

The air inlet hole 124 is formed at an upper portion of the post 120. That is to say, the air inlet hole 124 is positioned outside the reservoir or lake, to allow the air present outside the water to be induced into the internal space 122.

The water inlet hole 126 is formed at a lower portion of the post 120. That is to say, the water inlet hole 126 is positioned in water to allow water to be induced into the internal space 122.

Therefore, the water level of the internal space 122 of the post 120 may be equal to the height of the reservoir or lake.

Figure 6:
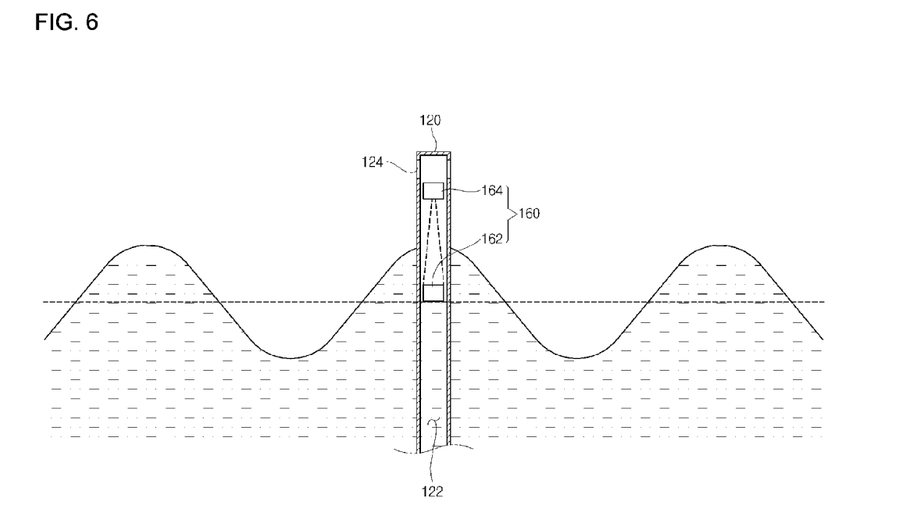
FIG. 6 illustrates essential parts of FIG. 5.

Referring to FIG. 6, the water level measurement unit 160 is positioned in the internal space 122 of the post 120 and measures the water level of the reservoir or lake.

In more detail, the water level measurement unit 160 may include a buoyancy member 162 and a distance measurement sensor 164.

The buoyancy member 162 is formed using a material having buoyancy and is positioned on a surface of the water induced into the internal space 122 of the post 120. The buoyancy member 162 may take any shape so long as it is sized to be positioned within the internal space 122.

The distance measurement sensor 164 is mounted in the internal space 122 of the post 120, detects the buoyancy member 162 and measures a distance from the buoyancy member 162 to the distance measurement sensor.

In more detail, the distance measurement sensor 164 is mounted in the internal space 122 of the post 120, specifically, above the buoyancy member 162. That is to say, the distance measurement sensor 164 is mounted at a point spaced from the bottom surface of the reservoir or lake at a predetermined height, measures a distance between the distance measurement sensor and the buoyancy member 162, and calculates a difference of the above distance, thereby measuring the water level of the reservoir or lake.

In addition, the distance measurement sensor 164 has a waterproofing function and is mounted under the buoyancy member 162 (that is, in water) if it can be operated in water, thereby measuring the water level by measuring the distance between the distance measurement sensor and the buoyancy member.

As described above, since the buoyancy member 162 and the distance measurement sensor 164 are positioned in the internal space 122 of the post 120, the surface of the water induced into the internal space 122 is not affected by waves occurring on the water surface of the reservoir or lake.

That is to say, since the buoyancy member 162 is not subjected to up-down movement by the wave, the distance measurement sensor 164 can more accurately measure the distance from the buoyancy member 162, thereby accurately measuring the water level of the reservoir or lake.

Hereinafter, a method for controlling a floating structure further including a water level measurement unit 160 according to the present invention will be described with reference to the accompanying drawings.

Figure 7:
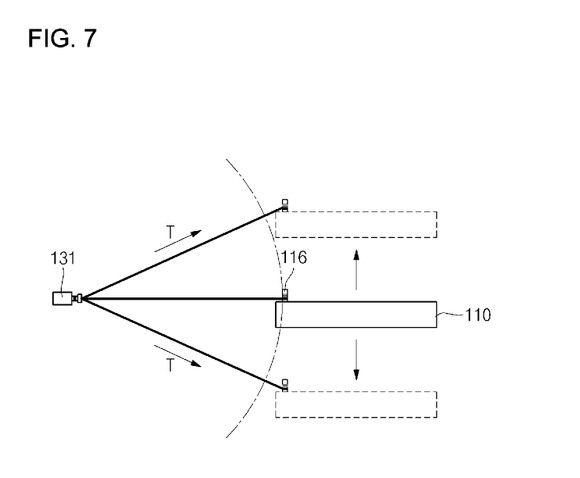
FIG. 7 illustrates operating states of the floating structure shown in FIG. 5.

As shown in FIG. 7, a control unit 150 determines a value measured by the water level measurement unit 160 and actuates first and second power devices 131 and 132 to adjust lengths of the first and second wires 133 and 134.

That is to say, the control unit 150 is mounted at the reservoir or lake side to then be connected to a distance measurement sensor 164 to determine the measured value received from the distance measurement sensor 164 and controls the actuations of the first and second power devices 131 and 132 based on the determination result. The control unit 150 and the distance measurement sensor 164 may be connected to each other on line.

In detail, the floating structure 110 moves up and down according to a change in the water level of the reservoir or lake. Here, the first and second wires 133 and 134 connected to the floating structure 110 extend to generate tension (T), and if the generated tension exceeds a tensile strength of the first and second wires 133 and 134, the first and second wires 133 and 134 may be broken.

Therefore, the control unit 150 receives data measured by the water level measurement unit 160 on line and compares the data with a value input to the control unit 150 for determination. In addition, the control unit 150 actuates the first and second power devices 131 and 132 to unwind the first and second wires 133 and 134 wound around a motor device 174 to maintain the tension to be lower than the tensile strength of the first and second wires 133 and 134, thereby preventing the first and second wires 133 and 134 from being broken. In addition, the control unit 150 may be connected to the first and second power devices 131 and 132 by wires (not shown) for transmitting electrical signals.

Therefore, since the floating structure 110 is not affected by the wave formed in the reservoir or lake, the water level can be accurately measured, and based on the measured water level, lengths of the first and second wires 133 and 134 can be controlled according to the change in the water level of the reservoir or lake, thereby maintaining stability of the floating structure.

Figure 8:
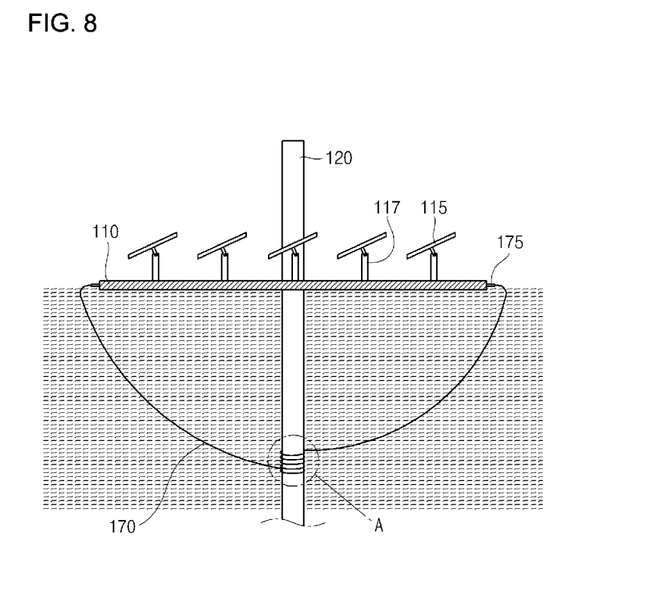
FIG. 8 is a laterally cross-sectional view of a floating structure controlling device according to still another embodiment of the present invention.

Meanwhile, as shown in FIG. 8, the floating structure controlling device may further include a rotation preventing wire 170.

The rotation preventing wire 170 is wound around one of top and bottom end of the post 120 (the bottom end in this embodiment) and the both ends are engaged with a connecting member 175 of the floating structure 110.

Preferably, the both ends of the rotation preventing wire 170 are loosely installed such that rotation of the floating structure 110 is not interfered.

Figure 9:
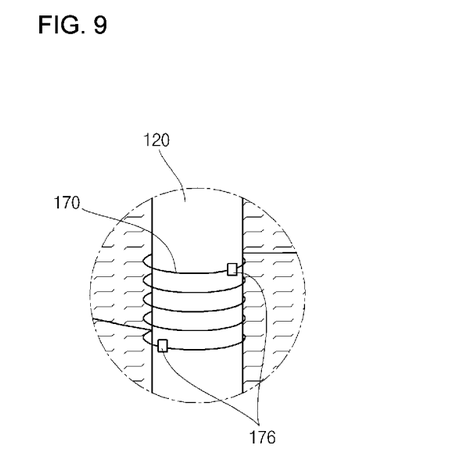
FIG. 9 illustrates a portion 'A' of FIG. 8.

Here, as shown in FIG. 9, in order to fix a winding position of the center of the rotation preventing wire 170, at least one wire fixing member 176 may further be fixedly installed at the post 120.

Figure 10:
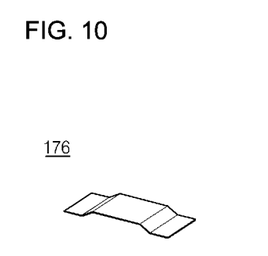
FIG. 10 is an enlarged view of a wire fixing member of FIG. 9.

As shown in FIG. 10, the wire fixing member 176 has a 'U' shaped cross section. In a case where both ends of the wire fixing member 176 are fixed, a space is formed in the wire fixing member 176.

Therefore, the rotation preventing wire 170 passes the space of the wire fixing member 176 and placed to enable a central winding portion of the rotation preventing wire fixed on a point of the floating structure 110 to be to be safely maintained.

Here, the same rotation preventing effect can be achieved such that a pair of wire fixing members 176 are fixedly installed on the post 120 in a connecting loop (not shown), one end of the rotation preventing wires 170 is connected to the connecting loop and the other end of the rotation preventing wire 170 is cross-linked to the connecting member 175 of the floating structure 110.

Figure 11:
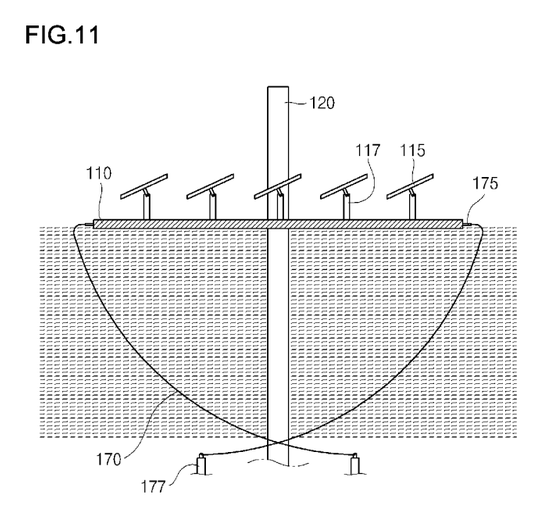
FIG. 11 is a laterally cross-sectional view of a modified embodiment of the floating structure controlling device shown in FIG. 8.

In addition, as shown in FIG. 11, the same rotation preventing effect can also be achieved such that a pair of ground fixing members 177, instead of the wire fixing member 176 or the connecting loop, are separately installed provided on the bottom of a water depth, one ends of the pair of rotation preventing wires 170 are connected to each other and the other ends of the rotation preventing wires 170 are cross-linked to the connecting member 175 of the floating structure 110.

In this case, both ends of the rotation preventing wire 170 may be loosely installed such that rotation of the floating structure 110 is not interfered. In particular, the post 120 and the pair of ground fixing members 177 are preferably arranged on a line.

Here, the same effect can be expected even when both ends of the ground fixing member 177 are loosely installed on the ground to be positioned in the same line with the post 120, rather than on the bottom of the water depth, such that the rotation of the floating structure 110 is not interfered.

Hereinafter, a method for controlling a floating structure further including a rotation preventing wire 170 according to the present invention will be described with reference to the accompanying drawings.

In a case where there is a big wave or wind due to an aggravating water environment, first and second wires 133 and 134 of a floating structure rotating unit 130 may be broken.

In such a case, a rotation restraining state in which a floating structure 110 is restrained by the first and second wires 133 and 134 may be released. As the result, an incidence angle with respect to a solar cell module may not be controlled, solar power generation may not be stably operated, and concerns of major facilities being damaged may be raised.

In this case, the floating structure 110 rotates in an uncontrollable manner in one direction by the wind and wave. Here, the rotation preventing wire 170 having both ends thereof loosely installed at both sides of the floating structure 110 is tightened to restrain rotation of the floating structure 110, thereby temporarily supporting the floating structure 110 in an emergent situation in which the first and second wires 133 and 134 of the floating structure rotating unit 130 are broken.

Therefore, even when the floating structure 110 is uncontrollable by the broken first and second wires 133 and 134 due to bad weather, the floating structure 110 can be temporarily supported in a safe manner, thereby preventing a solar power generating device and operating solar power generation in a stable manner after repairing an actuating member.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A device for controlling a floating structure, the device comprising:
   a floating structure (110) installed to be floatable on the water (W);
   a post (120) passing through the center of the floating structure (110) to then fixedly rise and inducing ascending and descending of the floating structure (110) according to the water level;
   a floating structure rotating unit (130) including a pair of first and second power devices (131, 132) installed on the ground, and a pair of first and second wires (133, 134) having both ends connected to the first and second power devices (131, 132) and the floating structure (110) to cross each other;
   a wire winding measurement unit (140) fixedly installed on the ground to correspond to the first wire (133) and measuring a wound amount; and a control unit (150) connected to the wire winding measurement unit (140) and controlling forward and backward actuations of the pair of first and second power devices (131, 132) according to a reference angle depending on the seasonal solar orbit.

2. The device of claim 1, wherein the wire winding measurement unit (140) includes a fixing member (141) fixedly installed on the ground, an extending member (143) supported at one side of the fixing member (141) and extending in a lengthwise direction of the first wire (133), a plurality of rollers (145) installed at one side of the extending member (143) so as to allow the first wire (133) to be wound at a constant interval and rotatably installed according to winding of the first wire (133), and a sensor member (147) fixed at the other side of the extending member (143) and sensing the number of turns of one of the plurality of rollers (145).

3. The device of claim 2, wherein the sensor member (147) includes a bar (147*a*) extending to the outside of the one of the plurality of rollers (145) and rotating in an interlocked manner, and a sensor (147*b*) installed at the other side of the extending member (143) so as to correspond to the bar (147*a*).

4. The device of claim 3, wherein the sensor (147*b*) is electrically connected to the control unit (150).

5. The device of claim 1, further comprising a water level measurement unit (160) positioned in an internal space (122) of the post (120) and measuring the water level.

6. The device of claim 5, wherein an air inlet hole (124) and a water inlet hole (126) are formed in the post (120), the air inlet hole (124) formed at an upper portion of the post (120) and allowing the inflow of air into the internal space (122), and the water inlet hole (126) formed at a lower portion of the post (120) and allowing the inflow of water into the internal space (122).

7. The device of claim 6, wherein the water level measurement unit (160) includes a buoyancy member (162) positioned on the surface of water induced into the internal space (122) of the post (120), and a distance measurement sensor (164) mounted in an internal space of the floating structure (110) and measuring the distance between the distance measurement sensor and the buoyancy member (162).

8. The device of claim 1, further comprising a rotation preventing wire (170) having a center wound around either of top and bottom ends of the post (120) and both ends engaged with both sides of the floating structure (110).

9. The device of claim 8, wherein both ends of the rotation preventing wire (170) are loosely installed such that rotation of the floating structure (110) is not interfered.

10. The device of claim 8, wherein a wire fixing member (176) is installed in the post (120), the wire fixing member (176) fixing a winding position of the rotation preventing wire (170).

11. A method for controlling a floating structure, the method comprising:
    actuating first and second power devices (131, 132) forward and backward;
    measuring a rotation angle of the floating structure (110) based on a wound amount of the first wire (133);
    comparing the measured rotation angle of the floating structure (110) with a reference angle input according to the seasonal solar orbit; and
    fixing the floating structure (110) by stopping the actuating of the first and second power devices (131, 132).

12. The method of claim 11, further comprising, after actuating the first and second power devices, measuring a rotation time of a roller (145) having a bar (147*a*) installed therein when the first and second power devices (131, 132) are actuated forward and backward.

* * * * *